United States Patent [19]

Schermerhorn

[11] Patent Number: 5,615,768

[45] Date of Patent: Apr. 1, 1997

[54] MAGNIFYING HOLDER FOR A REMOTE CONTROL UNIT

[76] Inventor: David W. Schermerhorn, RR#2, Box 2245, Fort Ann, N.Y. 12827

[21] Appl. No.: 348,378

[22] Filed: Dec. 1, 1994

[51] Int. Cl.⁶ .................................................. B65D 85/38
[52] U.S. Cl. ........................ 206/305; 206/320; 248/205.2
[58] Field of Search .................................... 206/320, 305; 211/13; 248/176, 172, 205.2

[56] References Cited

U.S. PATENT DOCUMENTS

| | | | |
|---|---|---|---|
| 4,836,256 | 6/1989 | Meliconi | 206/523 |
| 4,863,026 | 9/1989 | Perkowski . | |
| 4,893,222 | 1/1990 | Mintzer | 211/13 X |
| 4,991,935 | 2/1991 | Sakurai . | |
| 5,119,239 | 6/1992 | Iaquinto et al. . | |
| 5,130,853 | 7/1992 | Sakurai . | |
| 5,269,484 | 12/1993 | Jones | 248/172 |
| 5,305,908 | 4/1994 | Le Blanc | 211/13 X |
| 5,307,209 | 4/1994 | Jaquinto et al. . | |
| 5,316,249 | 5/1994 | Anderson | 248/205.2 X |
| 5,370,241 | 12/1994 | Silvers | 211/13 |

*Primary Examiner*—Jimmy G. Foster
*Attorney, Agent, or Firm*—Schmeiser, Olsen & Watts

[57] ABSTRACT

The invention is a holder for a remote control unit. The holder includes a transparent top cover that preferably features a magnifying lens. Once a remote control unit is releasably secured within the holder, the holder functions to protect the remote control unit, make the unit easier to find and facilitate the use of the unit by magnifying the unit's face. The holder also includes cutouts in its sidewalls that provide access to the remote control unit. In a second version of the invention, the holder is capable of storing two remote control units in a back-to-back orientation. The holder then preferably features top and bottom transparent covers that each include a magnifying lens. The sides of the holder include two sets of openings that provide access to each of the remote control units.

10 Claims, 1 Drawing Sheet

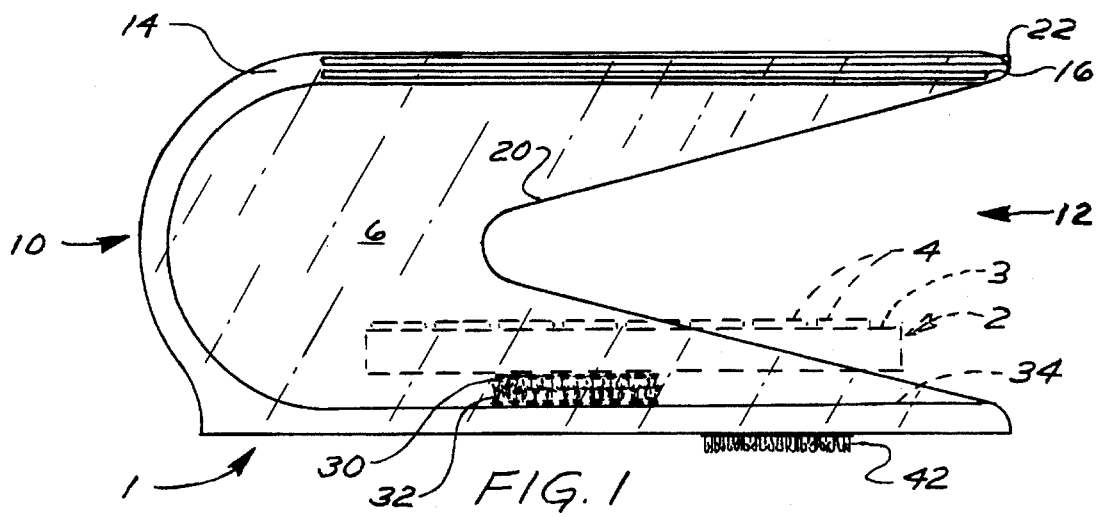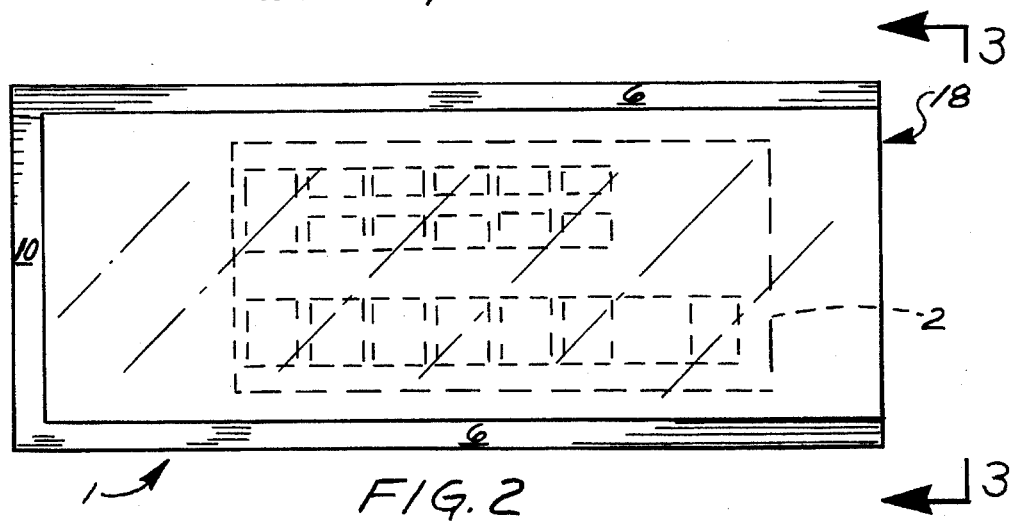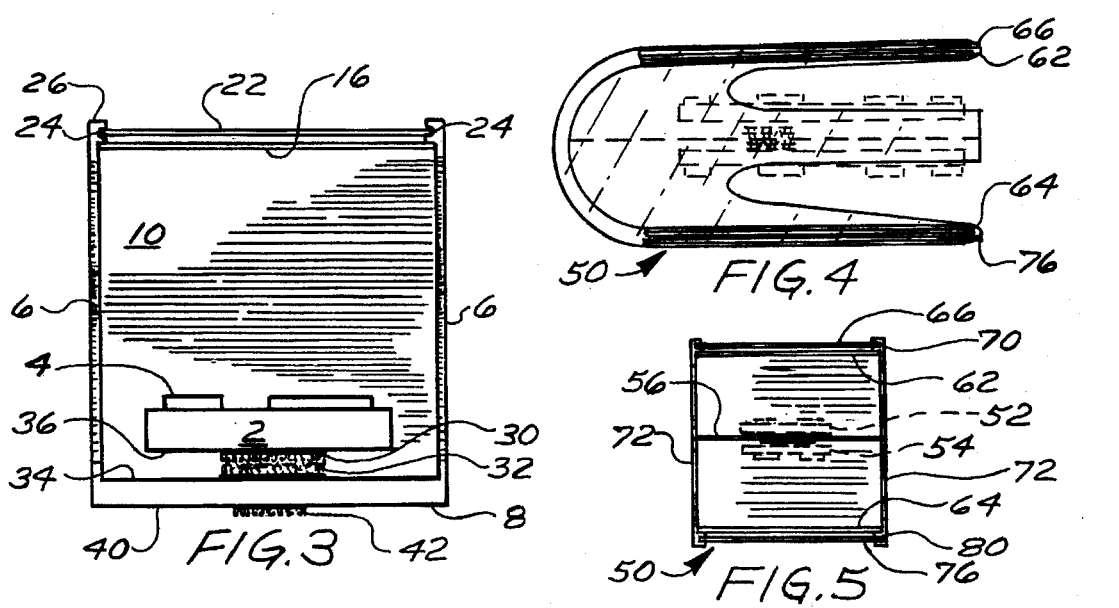

MAGNIFYING HOLDER FOR A REMOTE CONTROL UNIT

FIELD OF THE INVENTION

The invention is in the field of receptacles. More particularly, the invention is a portable holder designed to releasably contain a typical remote control unit. In the preferred embodiment of the invention, the top of the holder includes a magnifying lens. The lens functions to magnify the face of the remote control unit. This facilitates a user's being able to clearly see the labels that describe the function of each of the unit's buttons.

BACKGROUND OF THE INVENTION

It has become extremely common for households to have one or more remote control units for controlling various electronic devices such as televisions, video cassette recorders and stereo sound systems. Remote control units of this type are usually sized to fit a user's hand and feature a relatively large number of small button-type switches with each switch labeled relative to a function that it controls.

The compact size of most remote control units makes them easy to hold. However, their small size also creates a number of distinct problems.

Firstly, the small size of the unit makes it prone to being misplaced or damaged. The unit can fall between cushions of a chair or couch, or it can be inadvertently concealed under a larger object such as a magazine or newspaper. It is also a common occurrence for a user to inadvertently drop or knock a remote control unit onto the floor. Once on the floor, it can be overlooked and stepped on.

A second problem that arises due to the small size of most remote control units is that the labels for the buttons are hard to read due to their consequently small size. This is especially problematic for people who do not have excellent eyesight or when the labels are abbreviated and therefore not immediately understandable or recognizable as particular words.

The above problem is exacerbated in "full function" remote control units that include a great number of tiny buttons that function to control every aspect of the appliance. The indicia used on these units is usually even smaller than normal due to the greater number of buttons.

An additional problem with remote control units is that the switches that underlie the buttons can be damaged if a user accidentally spills a liquid onto the unit. This is especially a problem when one or more remote control units are placed on a coffee table or similar surface where foods may also be placed.

Lastly, for people who have two or more remote control units, the multiple units create storage problems and make a room look cluttered when they are left on a table or other exposed surface. In addition, the multiple units are inconvenient to hold when the user wishes to operate two units almost simultaneously (e.g.—when one unit controls a cable TV box and the other unit controls the TV's volume control).

SUMMARY OF THE INVENTION

The invention is a portable holder designed to inwardly contain a remote control unit. The holder includes a transparent upper cover that allows the user to see the face of the remote control unit. The holder also includes two side openings and an end opening that provide the user with full accessibility to the remote control unit's buttons.

In the preferred embodiment, the top of the holder also includes a removable magnifying lens. The lens functions to magnify the face of the remote control unit, thereby making it easier for a user to read the labels associated with the unit's buttons.

The remote control unit is releasably secured within the holder using hook and pile fastening material. Similar fastening material may be employed on the base of the holder and at a remote location for temporary securement of the holder. Alternatively, the holder can include a swivel-type stand or be semi-permanently mounted on a chair or table using a swivel-type connection.

Also taught is a second embodiment of a holder in which the holder is capable of containing two remote control units. The units are secured in a back-to-back orientation with one unit facing up and the other facing down. The top and bottom surfaces of the holder are transparent and may include a magnifying lens to thereby enable a user to view the face of either unit. The user may then conveniently use either unit depending on which way the holder is oriented.

Therefore, the relatively large size and distinctive shape of the holder makes it easy for a user to see the holder and thereby locate the remote control unit. The holder also functions to substantially protect the remote control unit from damage due to falls or spills. The magnifying lens of the holder facilitates a user's being able to read the labels on the face of the unit. The second embodiment of the holder facilitates the storage and use of multiple remote control units.

BRIEF DESCRIPTION OF THE DRAWINGS

FIG. 1 is a side view of a holder in accordance with the invention. A remote control unit is shown in phantom within the holder.

FIG. 2 is a plan view of the holder and remote control unit shown in FIG. 1.

FIG. 3 is an end view of the holder and remote control unit shown in FIG. 1.

FIG. 4 is a side view of a second embodiment of a holder in accordance with the invention. Two remote control units are shown in phantom within the holder.

FIG. 5 is an end view of the holder and remote control units shown in FIG. 4.

DETAILED DESCRIPTION OF THE DRAWINGS

Referring now to the drawings in greater detail, wherein like reference characters refer to like parts throughout the several figures, there is shown by the numeral 1 a holder in accordance with the invention.

FIGS. 1–3 provide side, plan and end views respectively of a first embodiment of the holder 1. In FIGS. 1 and 2, a generalized depiction of a remote control unit 2 is shown in phantom. In FIG. 3, the unit 2 is shown in solid. The remote control unit is of the type normally used for controlling a television, cable TV box, video cassette recorder or stereo sound system. The unit 2 preferably measures one to three inches in width, one-quarter inch to one inch in height and from three to eight inches in length. The top face 3 of the unit features a plurality of control buttons 4.

The holder 1 is composed of two sides or sidewalls 6, a planar bottom member 8, a closed end 10 and an open end 12. The end 10 may also be open or have an opening therein (not shown) for an unobstructed passage of a signal from the remote. The holder is preferably fabricated from a transparent plastic material and is designed to be fully portable. Other rigid materials such as wood or metal may be used to fabricate the sides, closed end and bottom of the holder.

The top portion 14 of the holder includes a rectangular transparent sheet 16 of plastic material. The open interior area 18 of the holder is designed to receive the remote control unit 2 with the top of the unit readily viewable through sheet 16.

Each of the holder's sides 6 includes a 'V'-shaped cutout 20 that provides access to the interior area 18 of the holder. It should be noted that access to area 18 is also provided via the holder's open end 12.

Located at the top of the holder and overlying transparent sheet 16 is a magnifying lens 22 that is substantially identical in shape to sheet 16. The lens is preferably removable and fits within slots 24 located proximate the top edge 26 of each of the holder's sides 6. It should be noted that the holder can be made so that it does not employ the magnifying lens. Alternatively, the holder can be fashioned so that the magnifying lens takes the place of sheet 16. As another alternative, the magnifying lens can be laminated onto sheet 16. In the latter case, the laminated magnifier would either be fixed to sides 6 (similar to sheet 16) or removable via the use of slots 24.

Complementary portions of hook and pile fastening material 30 and 32 are secured to the top surface 34 of the holder's bottom member 8 and to the bottom face 36 of the remote control unit. The fastening material functions to releasably secure the remote control unit within the holder. It should be noted that other types of well-known fastening methods may be employed to secure the remote control unit, such as elastic straps or adjustable pockets that can receive the corners of the control unit.

Attached to the bottom face 40 of the holder's bottom member 8 is a portion 42 of hook and pile fastener material. The complementary portion would preferably be located in a convenient location, such as on the top of the device being controlled by the remote control unit 2, on the arm of a chair, on a tabletop or on any other convenient support surface. In this manner, the holder can be secured when not in use. In addition, a stand having a swivel can be secured to the base of the holder using either fastener 42 or through a direct connection to the base 8 of the holder.

In the preferred method of use, the remote control unit 2 is releasably secured within the holder 1 by joining the complementary portions 30 and 32 of the hook and pile material. A person then operates the remote control unit by inserting his or her fingers through the side cutouts 20 or through the open end 12 of the holder and pressing one or more of the unit's buttons 4 while viewing the face of the control unit through the transparent top portion of the holder. In the preferred embodiment, the magnifying lens 22 would be in place in the top of the holder and would function to magnify the top surface of the control unit when a user is viewing it through the top of the holder.

FIGS. 4 and 5 provide side and end views respectively of a second embodiment of a remote control unit holder 50 in accordance with the invention. The holder resembles a pair of holders 1 that have been combined. The design of the holder enables it to store two separate remote control units 52 and 54. Each control unit is of the same type as remote control unit 2. The back surface of each of the units is releasably secured to a horizontally-oriented central member 56 of the holder. In this manner, the two units are oriented with their front surfaces (and therefore their control buttons) facing away from member 56. Two sets 60 of hook and pile fastening material are used to releasably secure the units to member 56.

The holder 50 includes top and bottom transparent sheets, 62 and 64 respectively, made of a plastic or glass material. The holder also includes a removable magnifying lens 66 that overlies the top sheet 62. The lens fits into complementary slots 70 located proximate the top edge of the holder's opposite sides 72. A similar removable magnifying lens 76 covers the bottom sheet 64. Lens 76 is received within slots 80 located proximate the bottom of each of the holder's sides 72. Each lens is optional and may be used in lieu of the transparent sheets 62 and 64 or laminated with said sheets in the same manner as described for the holder 1.

In the position shown in the drawings, remote control unit 52 is positioned so that its top surface is readily viewed from above through sheet 62 and lens 66. The second remote control 54 is facing downwards and is not easily viewable. In this position, a user could easily operate control unit 52. If the user wished to operate the other remote control unit 54, he or she would rotate the holder one-hundred-eighty degrees and then remote control unit 54 would be readily viewable through sheet 64 and lens 76. In this manner, a single holder 50 provides protection, magnification and convenient access to two separate remote control units.

The embodiments disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

I claim:

1. A holder for at least one remote control unit, said holder comprising:

a receptacle having a top portion, at least a portion of which is transparent, a bottom portion, a first end portion that includes an opening, a second end portion and first and second side portions, each having an opening therein, said top, bottom, end and side portions thereby defining an interior area of the receptacle, and wherein said openings in said side portions have a size to allow access by a user's fingers to said interior area;

a first attachment means capable of releasably securing a portable first remote control unit fully within said interior area; and wherein the interior area of the receptacle is divided by a horizontally-oriented divider member and wherein the receptacle includes a second attachment means capable of releasably securing a second remote control unit fully within the interior area of the receptacle and wherein at least a portion of the bottom portion of the receptacle is transparent and wherein the top and bottom portions of the receptacle each includes a magnifying lens, adapted to complement the transparent portions of the top and bottom portions, whereby the first and second remote control units can be attached within the receptacle and each of the magnifying lenses will function to magnify the top surface of one of the units.

2. The holder of claim 1 wherein the top portion of the receptacle further includes a magnifying lens, adapted to complement the transparent portion of the top portion, and that functions to magnify the top surface of the first remote control unit placed within the receptacle.

3. The holder of claim 2 wherein the magnifying lens is removably secured to the receptacle by an attachment means.

4. The holder of claim 1 wherein each magnifying lens is removably secured to the receptacle by an attachment means.

5. The holder of claim 1 wherein the first and second attachment means that function to releasably secure the first and second remote control units within the receptacle are secured to the divider member.

6. A holder and remote control unit apparatus, said apparatus comprising:

a portable first remote control unit adapted to be handheld and having a top surface that includes a plurality of buttons that function to control a remotely-located electrical appliance;

a receptacle having a top portion, at least a portion of which is transparent, a bottom portion, a first end portion that includes an opening, a second end portion and first and second side portions, each having an opening therein, said top, bottom, end and side portions thereby defining an interior area of the receptacle, and wherein said openings in said side portions have a size to allow access by a user's fingers to said interior area;

a first attachment means capable of releasably securing said first remote control unit whereby said unit will be completely contained within said interior area; and wherein the interior area of the receptacle is divided by a horizontally-oriented divider member and wherein the receptacle includes a second attachment means capable of releasably securing a second remote control unit fully within the interior area of the receptacle and wherein at least a portion of the bottom portion of the receptacle is transparent and wherein the top and bottom portions of the receptacle each includes a magnifying lens, adapted to complement the transparent portion of the top an bottom portions, whereby said first and second remote control units can be attached within the receptacle and each of the magnifying lenses will function to magnify the top surface of one of the units.

7. The holder of claim 6 wherein the top portion of the receptacle further includes a magnifying lens, adapted to complement the transparent portion of the top portion, and that functions to magnify the top surface of the first remote control unit when said unit is placed within the receptacle.

8. The holder of claim 7 wherein the magnifying lens is removably secured to the receptacle by an attachment means.

9. The holder of claim 6 wherein each magnifying lens is removably secured to the receptacle by an attachment means.

10. The holder of claim 6 wherein the first and second attachment means that function to releasably secure the first and second remote control units within the receptacle are secured to the divider member.

* * * * *